C. M. CARNAHAN.
Assignor of one-half to W. J. HAMMOND.
MACHINE FOR SPLITTING BARS AND SHEETS OF IRON OR STEEL.
No. 10,729. Reissued May 25, 1886.
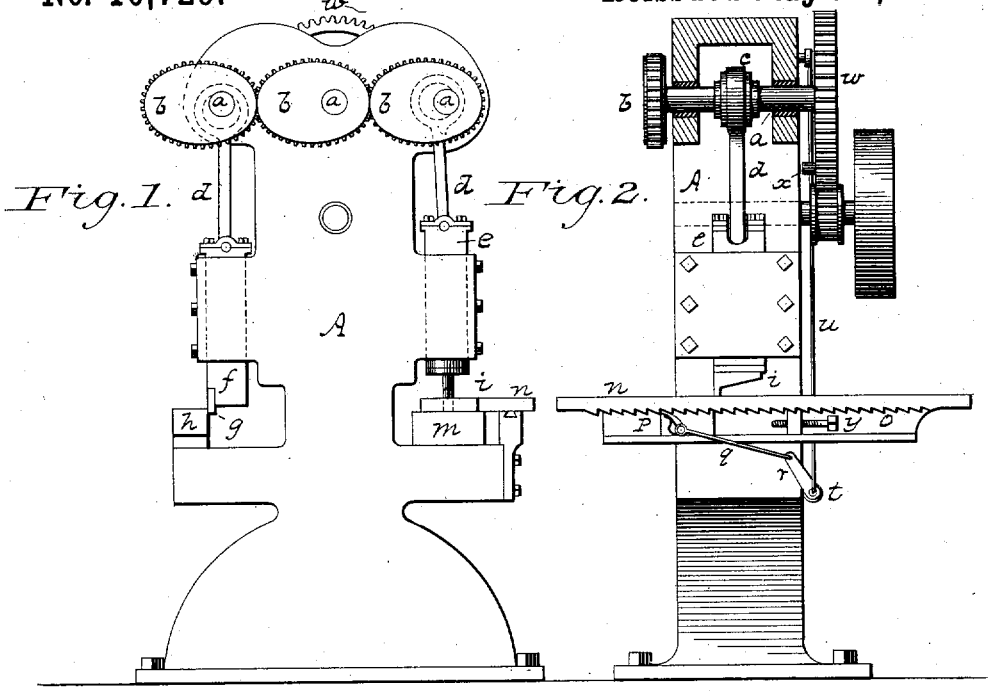
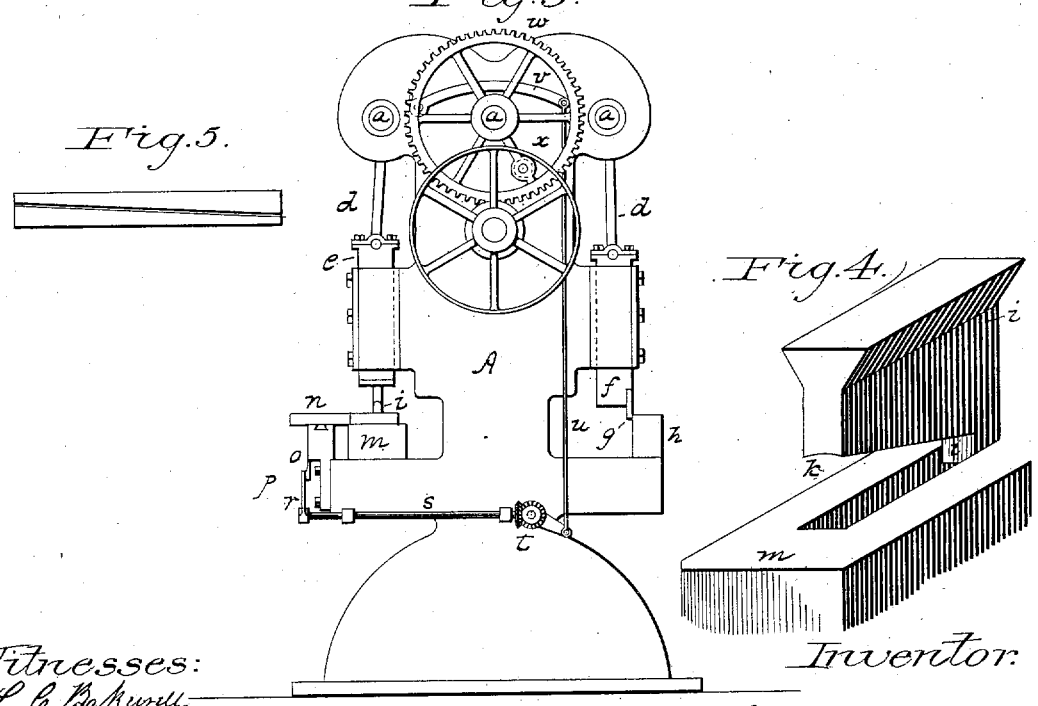
Witnesses:
L. C. Bakewell
L. C. Fitler
Inventor:
Cyrus M. Carnahan
By his attorney
James R. Bakewell
N. PETERS, Photo-Lithographer, Washington, D. C.

UNITED STATES PATENT OFFICE.

CYRUS M. CARNAHAN, OF PITTSBURG, ASSIGNOR OF ONE-HALF TO WILLIAM J. HAMMOND, OF BELLEVUE, PENNSYLVANIA.

MACHINE FOR SPLITTING BARS AND SHEETS OF IRON OR STEEL.

SPECIFICATION forming part of Reissued Letters Patent No. 10,729, dated May 25, 1886.

Original No. 314,221, dated March 24, 1885. Application for reissue filed November 4, 1885. Serial No. 181,863.

*To all whom it may concern:*

Be it known that I, CYRUS M. CARNAHAN, of Pittsburg, in the county of Allegheny and State of Pennsylvania, have invented a new and useful Improvement in Machines for Splitting Bars and Sheets of Iron or Steel; and I do hereby declare the following to be a full, clear, and exact description thereof.

This invention relates to improvements in metal splitting and slotting machines; and it consists in the construction and arrangement of parts, as will be hereinafter described, and particularly pointed out in the claims.

The object of my invention is to provide a machine which consists in dividing in the direction of its length thick plate metal or broad bars of iron by punching or cutting therefrom a succession of narrow pieces along the line of its required separation.

In the accompanying drawings, Figure 1 represents an elevation of that side of the machine carrying oblong eccentric gear-wheels so engaged as to impart proper motion to the vertically-moving punch and shear; Fig. 2, a front view of the machine, partly in section; Fig. 3, a reversed side of the machine, exhibiting the means used in giving an intermittent motion to the feeding device; Fig. 4, a perspective view of movable and stationary splitting-dies. Fig. 5 represents a broad bar of metal split or cut in two lengthwise and obliquely, after the manner and in accordance with the plan of my invention.

For the purposes hereinbefore mentioned I construct a machine by providing a cast-iron frame, A, of suitable size and sufficiently strong to sustain in a proper manner the several moving parts. Through the top of this frame A are arranged three parallel shafts, *a a a*, each of which is provided with an oblong eccentric gear-wheel, *b*, so combined and operating with respect to each other, the cams *c*, and connecting-links *d* as to impart an alternate vertically-reciprocating movement to the sliding heads *e f* and the tools attached thereto, in such a manner that each shall have a quick upward movement, but slow and powerful downthrust. To one, *f*, of these vertically-moving heads is attached an ordinary shear-blade, *g*, made to work in conjunction with a stationary block, *h*, affixed to the machine, by which the ends of metallic bars can be cut or trimmed as occasion may require.

To the sliding head *e*, on the opposite side of the machine, is attached a narrow slitting-tool, *i*, provided with an upwardly-inclined and concave face, *k*, the lower end of which terminates in a downward projection, *l*, that serves to keep the slitting-tool from entirely leaving the sharp-edged die-box *m*, wherein it is intended to work up and down, the projection *l* acting as a guide, or in a measure directing the plate or bar of iron being operated on.

It will be seen that by placing the end of a broad bar or thick plate of iron or steel on the box-die *m*, and advancing it under the slitting-tool *i* as it rises therefrom, on its descent a piece will be cut or punched out of said bar or plate equal in length to the distance so advanced, being limited in that respect by the projection *l* at the lower extremity of the cutting-tool *i*. On a further advancement of the iron bar or plate it will straddle the projection *l*, which will then guide the iron for a continuation of the cuts until the entire bar or plate is divided or split into two parts, which split or line of separation may be parallel with the edges of the bar, or obliquely thereto, thus making tapering or long wedge-shaped pieces, such as are used in agricultural machines and for other purposes.

To give the iron bar or plate a regular automatic and adjustable feed movement toward and under the splitting-tool *i*, a horizontally-sliding table, *n*, is provided, the upper surface of which is on a level with that of the die-box *m*, and having on its under side a long rack, *o*, or saw-toothed bar operated on by a pawl, *p*, connected by a link, *q*, to a crank, *r*, on a small rock-shaft, *s*, coupled by means of suitable beveled gear-wheels, *t*, to a vertically-moving rod, *u*, the upper end of which is hinged to a curved arm, *v*, having its opposite extremity pivoted to the main frame A of the machine, and in such manner as that, upon each revolution of the wheel *w*, a projecting pin, *x*, in one of its arms will at the proper time bring about a forward movement of the sliding table *n*, the stroke or travel of which may be adjusted and regulated through the instrumentality of the set-screw *y*.

By this machine, when operated in accordance with my invention, iron or steel bars or plates of any reasonable length may be divided longitudinally without twisting them out of shape or warping them to any extent, and as the cut is progressive by a series of completely punched-out pieces, no extra strain is imparted to other portions of the metal, which will be left smoother along the line of separation than when cut or divided by any other method.

Having thus described the nature of my invention and the means of putting it into practice, I claim—

1. The combination, with the frame A, its shafts *a*, gear-wheels *b*, and connecting-links *d*, the vertically-sliding heads *e f*, the latter having the blade *g*, and the stationary block *h*, of the adjustable endwise-movable table *n*, provided with a rack and operated by a pawl mechanism, as shown and described.

2. As an improvement in metal splitting and slotting machines, the same consisting of the frame A, shafts *a*, gear-wheels *b*, cams *c*, links *d*, and head *e*, having tool *i*, provided with concave face *k* and projection *l*, the die-box *m*, and the horizontally-sliding table *n*, provided with rack *o*, and mechanism, as described, for operating the machine, as specified.

3. As a device for cutting metal bars or sheets, the combination of a reciprocating cutting-tool, mechanism for actuating it, a die provided with a slot in the plane of motion of the cutting-tool, and a guide tongue or projection, *l*, reciprocating with the cutting-tool within a slot, said die and tool being arranged to cut from the bar or sheet a succession of narrow pieces along the line of required separation, substantially as and for the purposes described.

In testimony whereof I have hereunto set my hand this 14th day of October, A. D. 1885.

CYRUS M. CARNAHAN.

Witnesses:

THOMAS W. BAKEWELL,

W. B. CORWIN.